United States Patent [19]
Blackwell

[11] Patent Number: 5,717,692
[45] Date of Patent: Feb. 10, 1998

[54] APPARATUS AND METHOD FOR GENERALIZED DIGITAL NETWORK SIGNALING

[75] Inventor: Steven R. Blackwell, Huntsville, Ala.

[73] Assignee: Motorola, Inc., Schaumburg, Ill.

[21] Appl. No.: 631,099

[22] Filed: Apr. 12, 1996

[51] Int. Cl.$^6$ ...................................................... H04J 3/12
[52] U.S. Cl. ...................... 370/463; 370/466; 370/467
[58] Field of Search ...................... 370/110.1, 68.1, 370/79, 60, 58.1, 58.2, 58.3, 53, 419, 420, 421, 463, 464, 465, 466, 467, 522, 524; 379/242, 251, 243, 257, 350, 352, 353, 94, 90, 65; 364/238.2, 239.9, 242.94, 242.96, 284.4; 395/200.2, 182.03, 182.13

[56] References Cited

U.S. PATENT DOCUMENTS

| | | | |
|---|---|---|---|
| 4,539,676 | 9/1985 | Lucas | 370/60 |
| 5,333,189 | 7/1994 | Clary | 379/242 |
| 5,432,792 | 7/1995 | Burkart et al. | 370/110.1 |
| 5,479,402 | 12/1995 | Hata | 370/110.1 |
| 5,515,499 | 5/1996 | Allen et al. | 395/182.03 |

*Primary Examiner*—Wellington Chin
*Assistant Examiner*—Huy D. Vu
*Attorney, Agent, or Firm*—Nancy R. Gamburd; John W. Powell

[57] ABSTRACT

A data communication system (100) has a table driven state machine (300) for communicating call establishment and call termination information with a network switch (200). The table driven state machine (300) has a processor (310) and a memory (320) which stores a set of vectors defining a state transition table for a predetermined signaling type of the switch (200), such as trunk signaling or wink start signaling. The set of vectors defines state transitions and output signals, such as transmit AB signaling bits and a ring flag, based upon input signals of the predetermined signaling type, such as receive AB signaling bits and an off hook flag. The set of vectors is utilized by the processor (310) to receive signaling information from the switch, and to generate signaling information to the switch and other output signals to the data communication system, all corresponding to the predetermined signaling type. The sets of vectors may be varied based upon the selected predetermined signaling type utilized by the switch (200) and may be downloaded into the data communication system (100) or other data communication device.

33 Claims, 7 Drawing Sheets

| BYTE | DEFINITION | VALUE |
|---|---|---|
| 0 | NEXT STATE FOR RECEIVE a,b = 0,0 RxAB | 0 TO 24 |
| 1 | NEXT STATE FOR RECEIVE a,b = 0,1 RxAB | 0 TO 24 |
| 2 | NEXT STATE FOR RECEIVE a,b = 1,0 RxAB | 0 TO 24 |
| 3 | NEXT STATE FOR RECEIVE a,b = 1,1 RxAB | 0 TO 24 |
| 4 | NEXT STATE FOR DEVICE "OFF-HOOK" (WHEN ON-HOOK FLAG = 1) | 0 TO 24 |
| 5 | NEXT STATE FOR DEVICE "ON-HOOK" (WHEN ON-HOOK FLAG = 1) | 0 TO 24 |
| 6 | NEXT STATE FOR DEVICE "TIMEOUT" (WHEN ON-HOOK FLAG = 0) | 0 TO 24 |
| 7 | CURRENT STATE FOR TRANSMIT a,b BITS TxAB | 0,0 0,1 1,0 1,1 |
| 8 | CURRENT STATE TIMER COUNTDOWN VALUE (INITIAL VALUE OF COUNTER) | (1 TO 255) X (3MS), 0=DISABLE |
| 9(BIT 0) | CURRENT STATE RINGING INDICATION (RING FLAG) | 0=NOT RINGING 1=RINGING |
| 9(BIT 1) | CURRENT STATE LOOP CURRENT INDICATION (LOOP CURRENT FLAG) | 0=NO LOOP CURRENT 1=LOOP CURRENT |
| 9(BIT 2) | CURRENT STATE LINE-IN-USE INDICATION (LINE-IN-USE FLAG) | 0=NOT IN-USE 1=IN USE |

| | STATE | 0 | 1 | 2 | 3 | 4 | 5 | 6 |
|---|---|---|---|---|---|---|---|---|
| | STATE NAME | START | IDLE | RING | DIAL | ON-LINE | NET-DROP | DEVICE-DROP |
| 720 | RxAB=(0,0) | 1 | 1 | 1 | 3 | 5 | 5 | 1 |
| | RxAB=(0,1) | 1 | 1 | 1 | 3 | 5 | 5 | 1 |
| | RxAB=(1,0) | 0 | 2 | 2 | 4 | 4 | 4 | 6 |
| | RxAB=(1,1) | 0 | 2 | 2 | 4 | 4 | 4 | 6 |
| 730 | OFF-HOOK FLAG=1 | 0 | 3 | 4 | 3 | 4 | 5 | 4 |
| | ON-HOOK FLAG=1 | 0 | 1 | 2 | 1 | 6 | 1 | 6 |
| 740 | TIMEOUT FLAG=0 | 0 | 1 | 2 | 3 | 4 | 5 | 6 |
| | TIMER COUNT | 0 | 0 | 0 | 0 | 0 | 0 | 0 |
| | OUTPUT SIGNALS | | | | | | | |
| 750 | TxAB = | (0,0) | (0,0) | (0,0) | (1,1) | (1,1) | (1,1) | (0,0) |
| | RING FLAG | 0 | 0 | 1 | 0 | 0 | 0 | 0 |
| | LOOP CURRENT FLAG | 0 | 0 | 0 | 1 | 1 | 0 | 0 |
| | LINE IN USE FLAG | 0 | 0 | 1 | 1 | 1 | 0 | 0 |

FIG.8

| STATE | 0 | 1 | 2 | 3 | 4 | 5 | 6 | 7 | 8 | 9 | 10 |
|---|---|---|---|---|---|---|---|---|---|---|---|
| STATE NAME | START | IDLE | FIRST DELAY | WINK | SECOND DELAY | RING | WAIT | VALID CHECK | ON LINE | NET-DROP | DEVICE-DROP |
| RxAB=(0,0) | 1 | 1 | 1 | 1 | 1 | 1 | 6 | 6 | 9 | 9 | 1 |
| RxAB=(0,1) | 1 | 1 | 1 | 1 | 1 | 1 | 6 | 6 | 9 | 9 | 1 |
| RxAB=(1,0) | 0 | 2 | 2 | 3 | 4 | 5 | 7 | 7 | 8 | 8 | 10 |
| RxAB=(1,1) | 0 | 2 | 2 | 3 | 4 | 5 | 7 | 7 | 8 | 8 | 10 |
| OFF-HOOK FLAG=1 | 0 | 6 | 2 | 3 | 4 | 8 | 6 | 7 | 8 | 9 | 8 |
| ON-HOOK FLAG=1 | 0 | 1 | 2 | 3 | 4 | 5 | 1 | 1 | 10 | 1 | 1 |
| TIMEOUT FLAG=1 | 0 | 1 | 3 | 4 | 5 | 5 | 6 | 8 | 8 | 9 | 10 |
| TIMER COUNT | 0 | 0 | 58 | 67 | 67 | 0 | 0 | 100 | 0 | 0 | 0 |
| OUTPUT SIGNALS | | | | | | | | | | | |
| TxAB= | (0,0) | (0,0) | (0,0) | (1,1) | (0,0) | (0,0) | (1,1) | (1,1) | (1,1) | (1,1) | (0,0) |
| RING FLAG | 0 | 0 | 0 | 0 | 0 | 1 | 0 | 0 | 0 | 0 | 0 |
| LOOP CURRENT FLAG | 0 | 0 | 0 | 0 | 0 | 0 | 1 | 1 | 1 | 0 | 0 |
| LINE IN USE FLAG | 0 | 0 | 1 | 1 | 1 | 1 | 1 | 1 | 1 | 0 | 0 |

WINK START SIGNALING STATE MACHINE TABLE

APPARATUS AND METHOD FOR GENERALIZED DIGITAL NETWORK SIGNALING

FIELD OF THE INVENTION

This invention relates in general to data communication systems and, more specifically, to an apparatus and method for generalized digital network signaling.

CROSS-REFERENCE TO RELATED APPLICATION

This application is related to the applicants' U.S. patent application Ser. No. 08/505,425, filed Jul. 21, 1995, entitled "Method and Apparatus for Storing and Restoring Controller configuration Information in a Data Communications System", incorporated by reference herein. The present application claims priority for all commonly disclosed subject matter.

BACKGROUND OF THE INVENTION

For data communication through a communication network, such as a T1 or E1 network, there are known and established protocols or methods for call establishment (call setup) and call termination (call tear down). These protocols typically require communication or other exchange of switching information between a data communication system, on the one hand, and a switch (typically the first switch) within the network, on the other hand. The switch may be located in a central office ("CO") of a service provider, in a private branch exchange ("PBX"), or in other similar equipment. Such switches are typically manufactured by any one of many manufacturers, and are configured to exchange information using a predetermined protocol (or signaling type) specific for that type of switch. In order to successfully exchange information, the data communication system should be configured to operate according to the signaling type of the particular switch. Many of the well known or more standardized signaling types are described in Bellcore and other specifications, such as wink start signaling, loop start signaling, immediate start signaling, delay start signaling, ground start signaling, and trunk signaling. Due to the independence and variety of service providers, and due to many national requirements specific to a given country, there is tremendous variation in signaling types internationally, with a large number of standard, near-standard, and non-standard signaling types. In order to meet the needs of these various service providers in various countries, it is highly desirable for a manufacturer of a data communication system to provide a potential for utilization of a large number or variety of signaling types.

For digital networks, such as T1 or E1 networks or channel banks, the communication between the data communication system and the switch typically occurs using "A" (or "a") and "B" (or "b") signaling bits (also referred to as "AB" or "ab" signaling bits). A description of the frame structure for T1 and E1 signals is described in numerous telecommunications publications, such as R. Freeman, *Reference Manual for Telecommunications Engineers* (Wiley-Interscience 1985). Information for call setup and call tear down is conveyed through the exchange of AB signaling bits, between the switch and the data communication system, in accordance with the signaling type of the switch. Both the switch and the data communication system should respond according to the signaling type (or signaling protocol) of the switch in order to reliably establish a telecommunications connection for voice or data transmission and other services.

Various prior art methods have evolved to implement the varied signaling types for the switches of digital networks, such as T1 and E1 networks. Typically, a signaling type may be implemented as a specific state machine or equivalent program in both the switch and the data communication system. These state machines are designed to specifically respond according to the corresponding specific signaling type and, for example, may be implemented in a data communication system as a program in a processor, such as in an Intel 8031 microprocessor.

One prior art method for providing such a state machine consists of preparing a specific program to implement the functions of a particular signaling type, followed by installing the first program in data communication system firmware. When a data communication system may need to operate with a second signaling type, however, a second program is needed to replace the first program. While this process may work for additional signaling types, this method requires a firmware change for each signaling type and may have upgrade costs associated with switch modifications. Such firmware changes are cumbersome, expensive, and difficult to implement in the field or on site at the premises of the data communication system.

Another prior art method consists of generating a set of programs, one program for each of the well-known signaling types, and installing the entire set of programs in the data communication system firmware. While this prior art method may meet the needs of many service providers, determining and preparing programs for a complete set of well-known signaling types is time consuming, burdensome, and expensive. In addition, the volume of code for such a set of programs typically exceeds the memory available within the data communication system, and adding such a set of programs would require adding memory (and corresponding additional space on a circuit board) in the data communication system. In addition to the additional costs associated with such programming and additional memory, this method does not provide for a data communication system to communicate with any switches other than those included within the program set, such as a switch having a non-standard or less well-known signaling type or protocol.

Accordingly, a need has remained to provide an apparatus and method in a data communication system which may communicate utilizing a wide variety of signaling protocols, without creating additional programs or without a significant increase in memory usage. In addition, because there are a large number of signaling types in currently installed switches and because new signaling types are being developed to meet future network requirements, a need has remained to provide for a flexible and modifiable apparatus and method in a data communication system, which may be easily changed or modified in the field to provide for communication with any particular switch having a given signaling type.

DETAILED DESCRIPTION OF THE INVENTION

As mentioned above, a need has remained to provide an apparatus and method in a data communication system which may communicate utilizing a wide variety of signaling protocols, which are readily and flexibly modifiable, which do not require the creation of separate and additional programs, and which do not require a significant increase in memory usage. The apparatus and method in accordance with the present invention utilizes a generalized signaling scheme in which a set of signaling parameters are incorporated for communication using a specific signaling protocol. By varying the set of parameters, the apparatus and method of the present invention may be utilized with a wide variety of signaling protocols, without changing the generalized signaling program itself. In addition, any new set of parameters may be readily downloaded into a data communication device or system, providing significant system flexibility and ease of modification in the field. Moreover, the apparatus and method of the preferred embodiment of the invention may be implemented without additional, substantial memory requirements.

Figure 1:
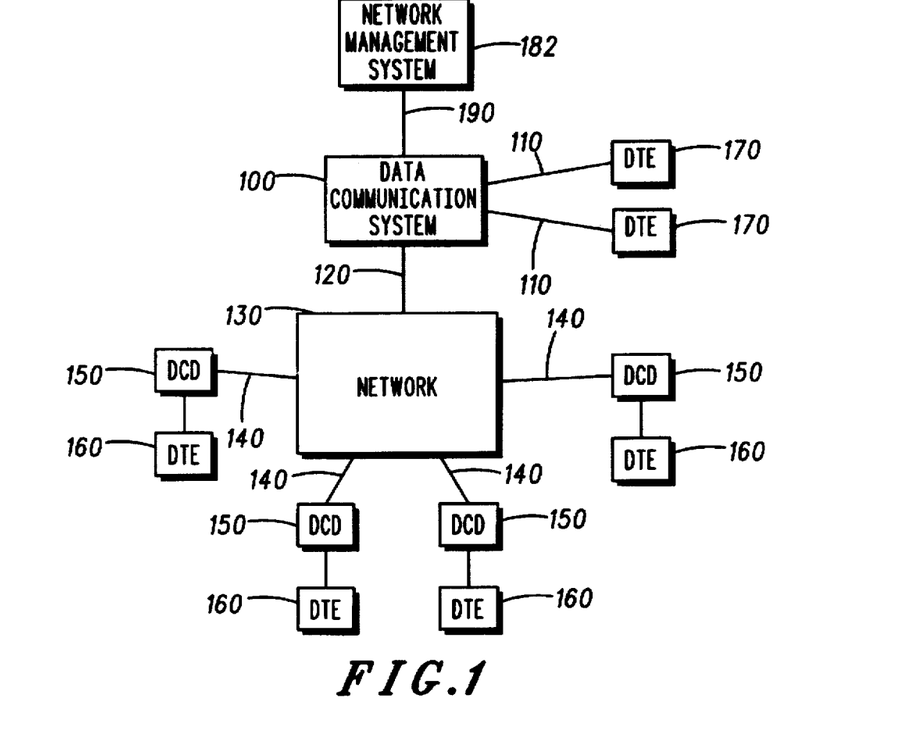
FIG. 1 is a block diagram illustrating a data communication system in accordance with the present invention.

FIG. 1 is a block diagram illustrating a data communication system ("DCS") 100 connected to a network 130, such as a telephone network. The data communication system 100 is connected to the network 130 via line 120, which may be a T1 channel bank, (in North America), an E1 channel bank (in Europe and other locations), or any other digital connection. The data communication system 100 provides for data and other information communication between any of a plurality of data terminal equipment ("DTEs") 170 and any of the plurality of remote data terminal equipment 160. The data communication system may be, for example, a Motorola DAS 925 Wide-Area Network Bandwidth Management System or another equivalent system. The data communication system 100 is comprised of a plurality of data communication devices ("DCDs") and other components capable of providing a variety of data communication functions. The DCDs may be modems, such as a V.34 modem, ISDN terminal adapters, digital modems, hybrid analog/digital modems, or other data communication components. The DCDs within the data communication system 100 provide data and other information communication with remote DCDs 150, which may be located at remote sites. The remote connection 140 between the remote DCDs and the network 130 may be, for example, an analog connection or a digital connection. In the preferred embodiment, the data communication system 100 typically includes a network management system 182, for exchange of control information and other control data between the data communication system 100 and a network management system 182 (via a connection 190, also referred to as a network management connection). The apparatus and method of the present invention may be incorporated within any number of the devices illustrated in FIG. 1, including the data communication system 100 or any of the DCDs 150 DTEs and 170.

Figure 2:
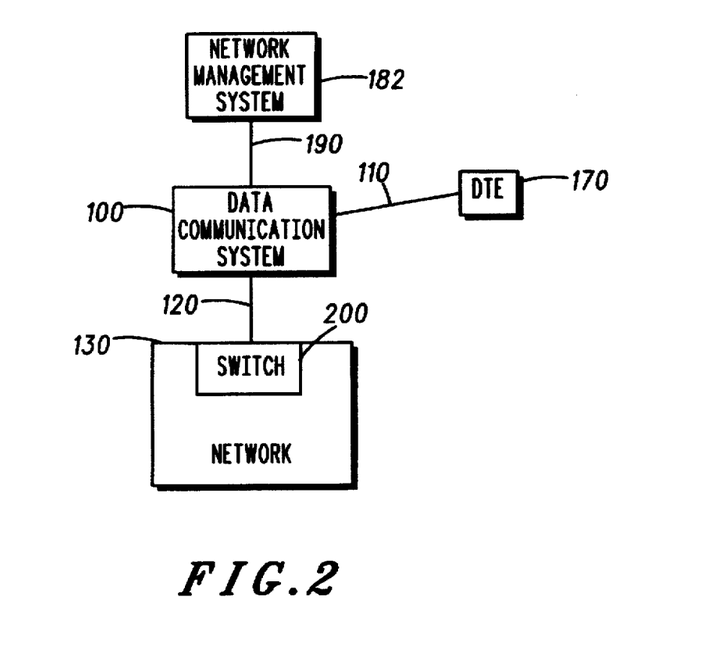
FIG. 2 is a block diagram illustrating a data communication system coupled to a central office switch in accordance with the present invention.

FIG. 2 is a block diagram illustrating the connection of the data communication system 100 to a switch 200 within the network 130. Because the data communication system connection 120 to the switch is typically either a T1 channel or an E1 channel, AB signaling bits are used to communicate signaling information for call setup or call tear down. State machines in both the data communication system 100 and the switch 200 should respond to the AB signaling bits in accordance with a predetermined signaling type of the switch 200. The data communication system, preferably utilizing a state machine as discussed in greater detail below, receives AB signaling bits from the switch 200, referred to as receive AB signaling bits or RxAB. In response to the RxAB, the data communication system transmits AB signaling bits to the switch 200, referred to as transmit AB signaling bits or TxAB. The state machine of the data communication system (or other data communication device), referred to as a data communication system state machine or "DSM", may be implemented as a program and state tables in a processor in accordance with the present invention. As discussed in greater detail below with reference to FIG. 3, the DSM receives and transmits AB signaling bits, and also responds to other input and output signals.

Figure 3:
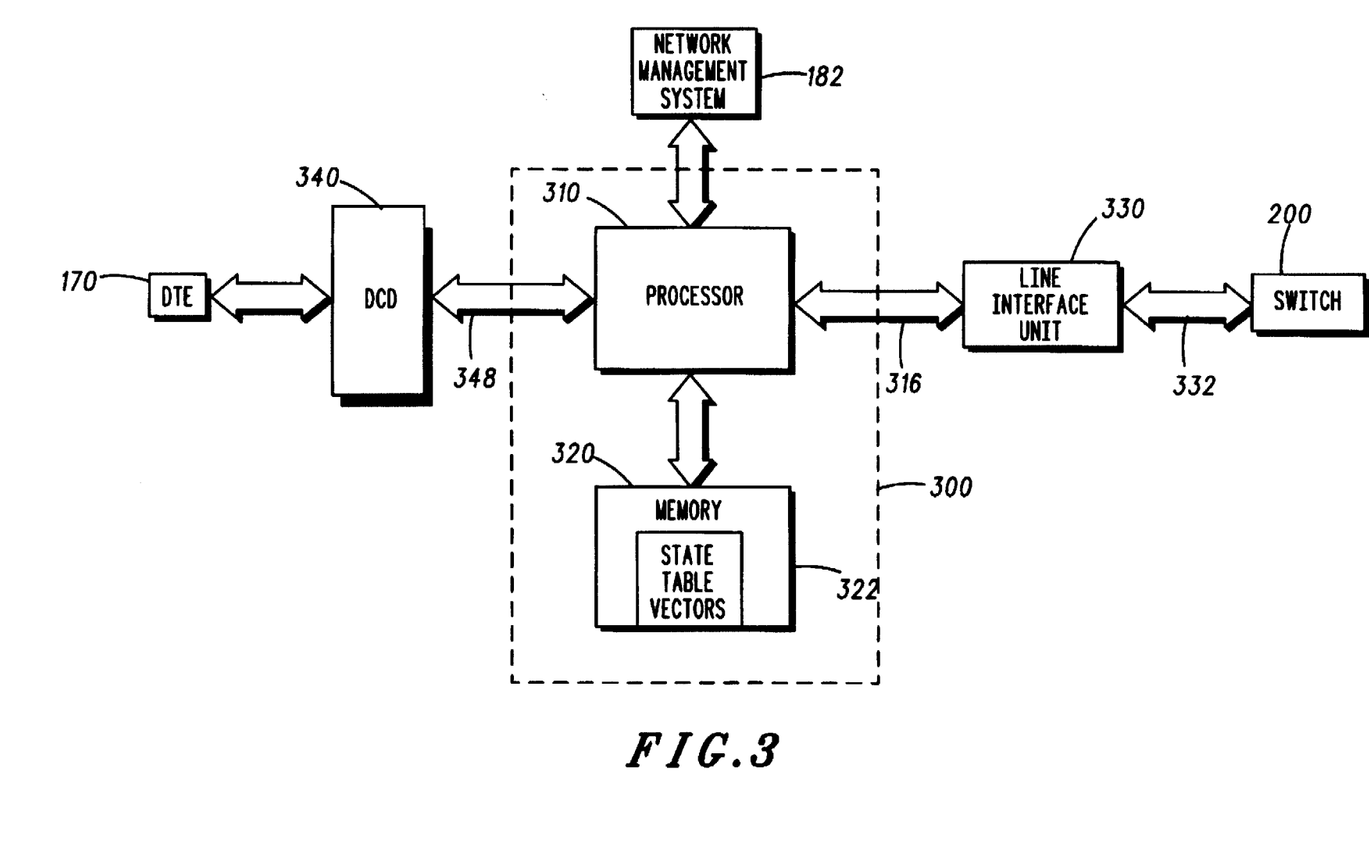
FIG. 3 is a block diagram illustrating an apparatus in accordance with the present invention.

FIG. 3 is a block diagram illustrating an apparatus, referred to as a table-driven state machine ("TDSM") 300, in accordance with the present invention. In the preferred embodiment, the table-driven state machine 300 is comprised of a processor 310, with its associated memory 320 configured with a state table 322. As illustrated in FIG. 3, the TDSM 300 is coupled to a data communication device (DCD) 340 and to a line interface unit (LIU) 330; the LIU 330, in turn, is coupled to the switch 200 via a connection 332, such as a T1 or E1 connection. The LIU 330 and the connection 332 may be considered to be a communication channel or communication medium. The DCD 340, TDSM 300, and LIU 330 may be considered to be components of the data communication system 100. Line interface units, such as LIU 330, are known in the art and include means for separating AB signaling bits from other data and information, such as network data, transmitted from the switch 200 via connection 332. The TDSM 300 is also coupled to the network management system 182 via a network management connection 192, for example, to receive configuration information as disclosed in the related patent application referenced above. While not directly concerning the present invention, data and other information may be transferred between the DTE 170 and a remote DTE (not illustrated) via the DCD 340, the TDSM 300, and the LIU 330, then via the connection 332 and the switch 200 to the network 130 (not illustrated), through known methods. The TDSM 300 allows data to pass through in both directions between the DCD 340 and the LIU 330. In accordance with the present invention, the TDSM 300 responds to information received from the DCD 340 referred to as input signals, receive AB signaling bits (RxAB), and signaling configuration information stored in memory 320 as values in a state table 322. The state table 322, as discussed in greater detail below, is composed of vectors corresponding to each state of the TDSM, with values defining state transitions and output signals. The processing of information and data within the TDSM 300 is a function of the values in the state tables, receive AB signaling bits and other input signals, such as off hook and time-out flags or signals. Output signals are generated by the TDSM and comprise transmit AB signaling bits and other output signals such as a line-in-use flag, a ring flag, and a line current flag. The signaling configuration information stored in memory 320 as values in a state table 322 are based upon the signaling type (of the switch 200) and may be downloaded or transferred from the network management system 182 to the memory 320, preferably before connecting the data communication system 100 and the switch 200. In other embodiments not including a network management system 182, signaling configuration information may be downloaded to the TDSM 300 through other known means, such as through a software download from the DTE 170. The operation of the TDSM 300 is described in detail below with reference to FIGS. 4–10.

Figure 4:
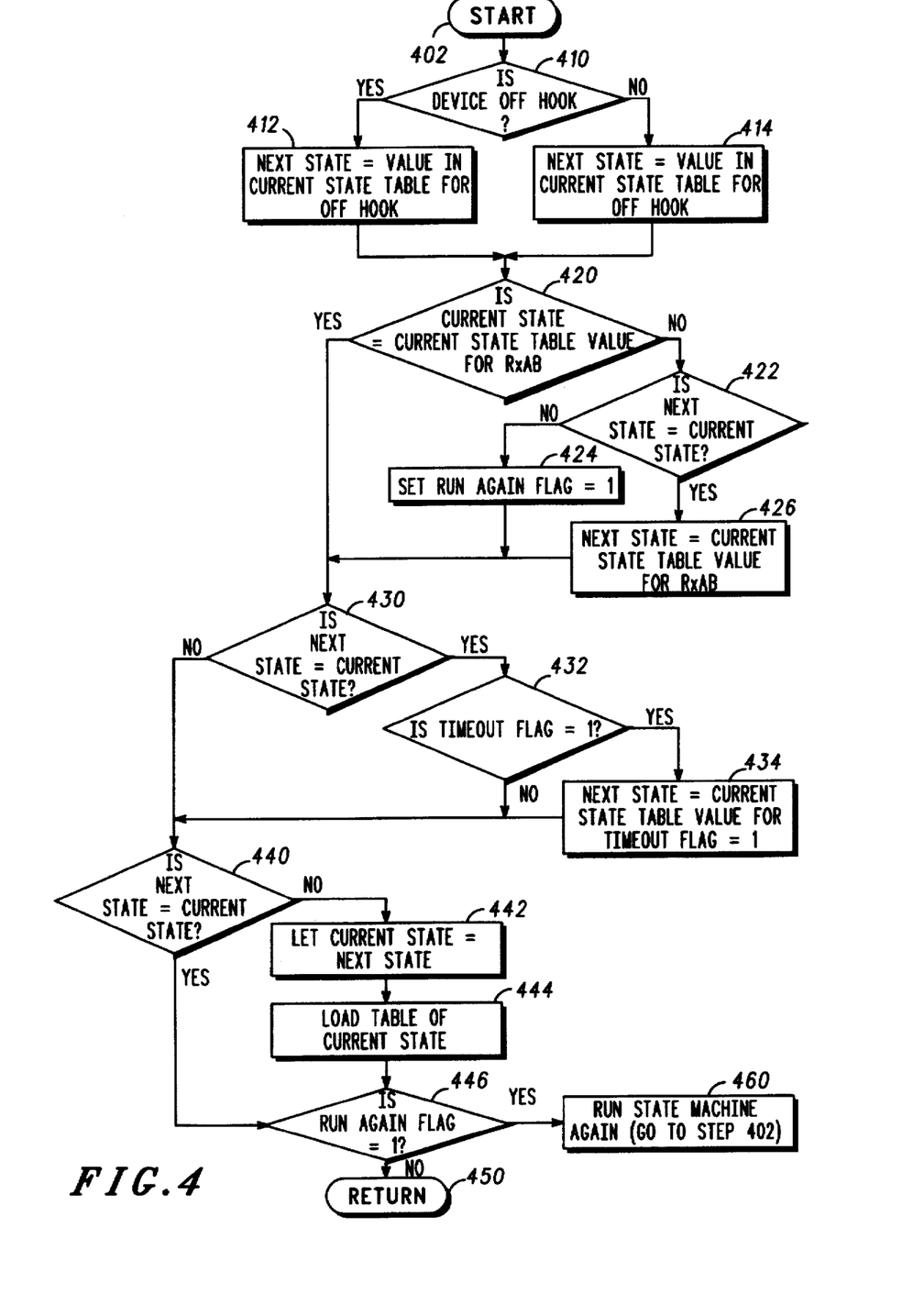
FIG. 4 is a flow diagram illustrating a method of a table driven state machine in accordance with the present invention.
Figure 5:
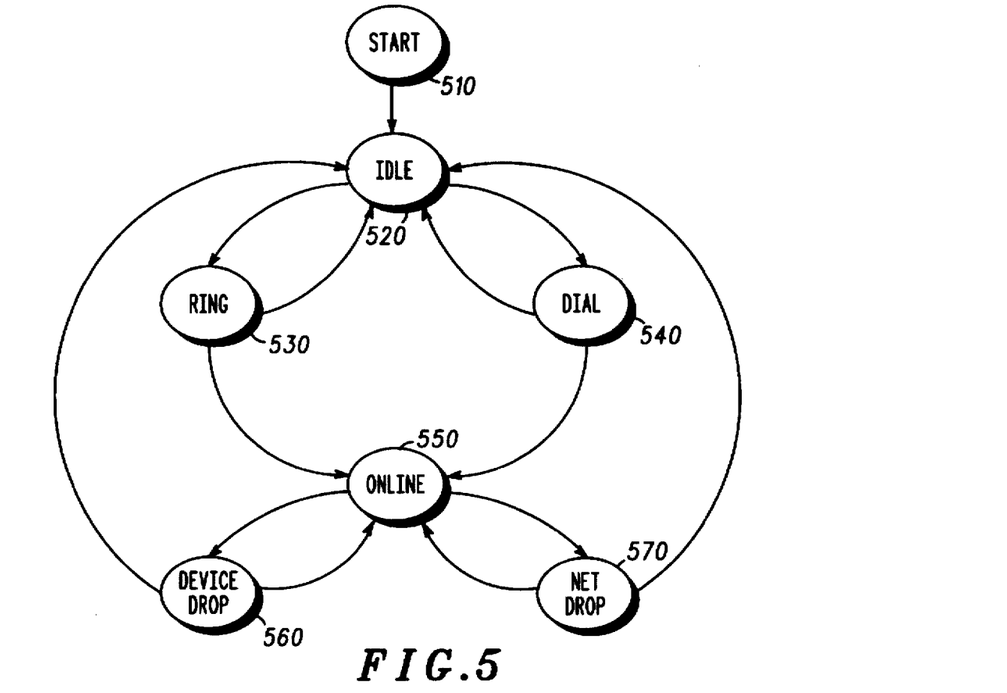
FIG. 5 is a state diagram illustrating trunk signaling in a table driven state machine in accordance with the present invention.
Figure 6:
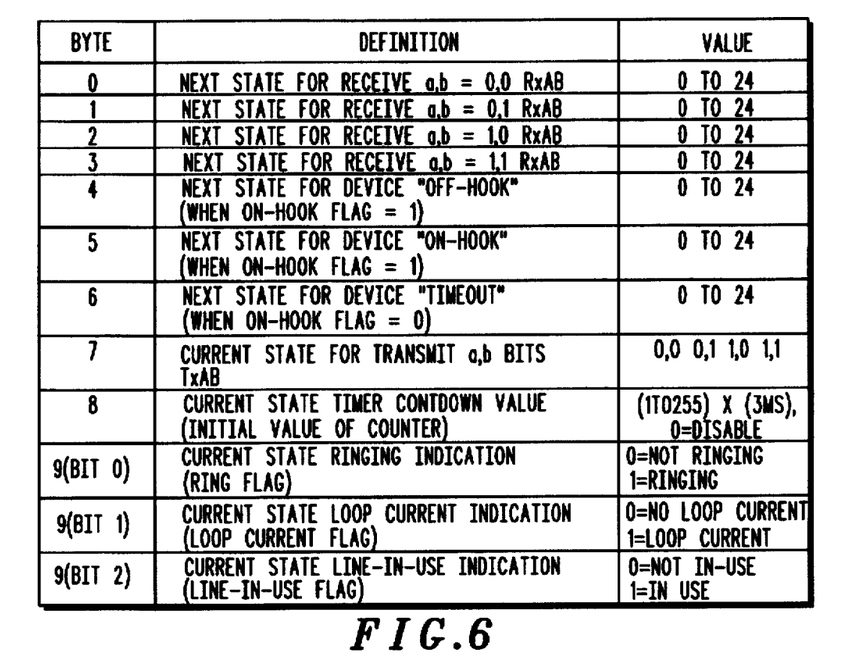
FIG. 6 is a byte definition table for a table driven state machine in accordance with the present invention.
Figure 7:
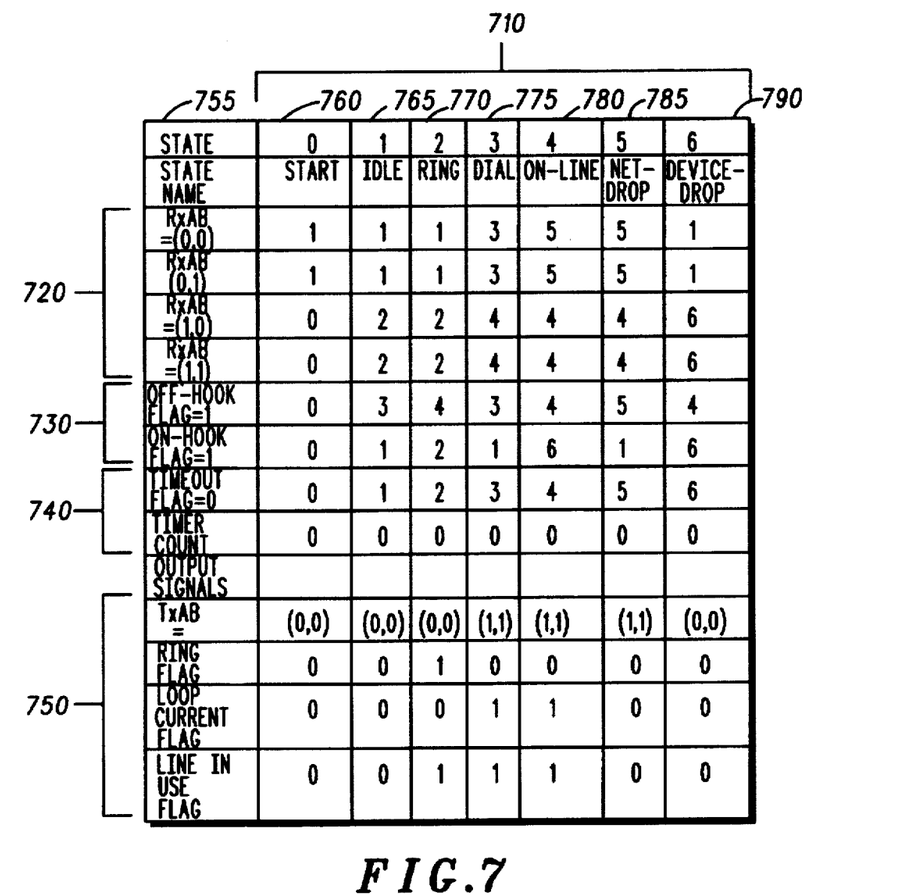
FIG. 7 is a trunk signaling state transition table for a table driven state machine in accordance with the present invention.

FIG. 4 is a flow diagram illustrating a method of a table driven state machine in accordance with the present invention, and is implemented as a set of program instructions in the processor 310, in conjunction with a state table stored in memory 320. The operation of the table driven state machine, as illustrated in FIG. 4, should also be considered with reference to FIGS. 5–7 which, as discussed in greater detail below, illustrate various aspects of signaling parameters for a signaling type, such as trunk signaling, state transitions, and a state table. In particular, FIG. 5 is a state diagram of a trunk signaling table driven state machine, illustrating various state transitions, such as idle 520, ring 530, and on-line 550. FIG. 6 is a byte definition table, used for state transitions for a given signaling type. As illustrated in FIG. 6, in the preferred embodiment, ten bytes 0–9 are defined for each state of the table driven state machine, with bytes 0–6 defining next states, and bytes 7–9 defining current states which have corresponding output signals, such as transmit AB signaling bits for byte 7. For example, byte 5 defines the next state for the device "on hook" (i.e., the on hook flag set to 1), and may take on values from zero to 24, for a total of 25 possible states, in the preferred embodiment. FIG. 7 is a state machine (or state transition) table, also referred to as a signaling table, for a given signaling type, and is illustrated for trunk signaling.

Referring to the flow diagram of FIG. 4, the table driven state machine checks various flags to determine whether any events have occurred which may trigger a next state, and if so, transitions to the next state. The processor "runs" the TDSM 300 by executing the method of FIG. 4, and may periodically run the TDSM 300 or start the TDSM 300 when input signals have changed, such as changes in the receive AB signaling bits. It should be noted that as states of the TDSM 300 are changed as discussed below, output signals from the TDSM 300 (which also may be input signals or flags to the TDSM 300), as implemented in the processor 310, are also changed. For example, the current state for the transmit AB signaling bits, defined as byte 7 in FIG. 6, will have different values depending upon the current state, and are transmitted to the switch 200 via the LIU 330 (via bus 316). As illustrated in FIG. 7, the values of TxAB may be (1, 1) (i.e., A=1, B=1) when the TDSM is in the DIAL state, illustrated in column 775. The values of TxAB may be (0, 0) (i.e., A=0, B=0) when the TDSM is in the RING state, illustrated in column 770. Correspondingly, other output signals, such as ring flag (byte 9, bit 0) and loop current flag (byte 9, bit 1) are transmitted to the DCD 340 via bus 348. The line-in-use flag (byte 9, bit 2) is coupled to the network management system 182 to be used in accordance with a network management protocol, if any.

Referring to FIG. 4, beginning with start step 402, the method begins when an associated flag or variable has changed, such as a change in the received AB signaling bits, the off hook state of the DCD, or a time-out occurring in a timer. Accordingly, the method first determines whether the DCD has gone off hook, step 410. If the device has gone off hook in step 410, then in step 412, the state machine sets or loads a next state variable to be the value in the signaling table corresponding to going off hook, given the current state of the TDSM. If the device has not gone off hook in step 410, then in step 414, the state machine sets or loads a next state variable to be the value in the signaling table corresponding to on hook, given the current state of the TDSM. For example, for the trunk signaling table illustrated in FIG. 7, reading down column 760 (labeled 0 or start) to either of the rows 730, for on hook or for off hook, the next state is also zero, and will be loaded into the next state variable in steps 412 and 414. The output signals, illustrated in rows 750 of FIG. 7, are also zeros for column 760. Next, in step 420, the method determines whether the current state is the same as the value, as indicated in the signaling table, for the receive AB signaling bits currently being received, i.e., determining whether the state "pointed to" by the current AB bits is, in fact, the current state of the TDSM. If the current state is not the current signaling (or state) table value for RxAB in step 420, then with the caveat discussed below (step 422), the TDSM will be driven to the next state as indicated in the currently received AB bits in step 426. For example, also reading down the column 760 in FIG. 7 to one of the rows labeled 720, for the case in which the receive AB signaling bits are (0, 0), namely, A=0 and B=0, the next state pointed to is 1, which is the idle state, and as a consequence, as illustrated in FIG. 5, the TDSM will transition from the start state 510 to the idle state 520. The caveat of step 422, namely, whether the next state is the same as the current state (such as the current state being idle and the next state (pointed to in the state table based upon RxAB) is also idle), is designed to arbitrate possible conflicts, such as going off hook at the same time the network signals an incoming ring. If the next state is not the current state in step 422, then in step 424, the state machine will be run again (set the run again flag equal to 1), to arbitrate the conflict. Other equivalent decisions could also be made in steps 422 and 424, such as providing that certain next states will have precedence over others, such as allowing off hook to override incoming ring. As mentioned above, when the next state is currently the same as the current state in step 422, the method proceeds to step 426, and the TDSM will be driven to the next state, setting the next state variable equal to the state table value pointed to by the current receive AB signaling bits.

Figure 8:
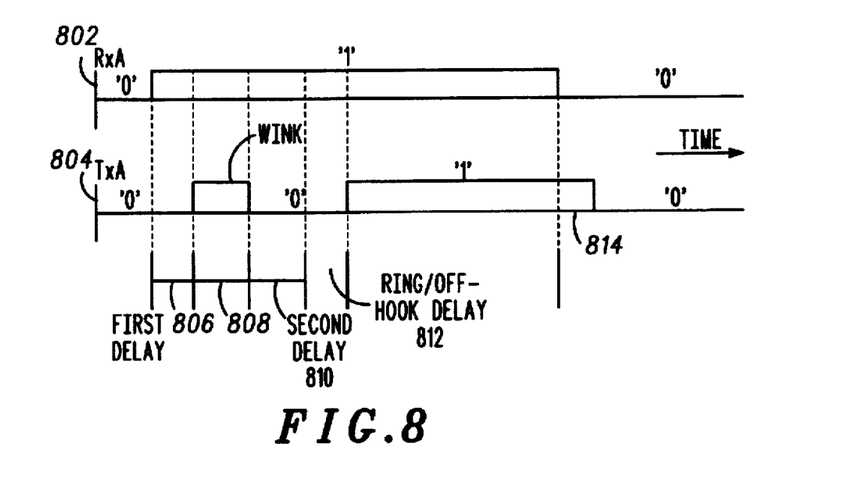
FIG. 8 is a wink start timing diagram for implementation in accordance with the present invention.

Continuing to refer to FIG. 4, if neither the hook state nor the received AB signaling bits has caused an event such as a change in an associated flag or variable, then in steps 430 and 432, the method determines whether a time-out has occurred, with the time-out flag set, for example, equal to one. If a time-out has occurred in step 432, then in step 434, the next state variable is set equal to the state table value pointed to by the time-out flag being set. For example, as illustrated in the wink start signaling of FIG. 9, if the TDSM is in the current state of 2 (first delay) (column 855), and the time-out flag is set to one, the table indicates a next state of 3, which is to wink, as illustrated in FIG. 8, and as illustrated by the transition of the TxAB bits from (0, 0) to (1, 1) of the TxAB row of the output rows 835. Next, if the next state is not the same as the current state (step 440), but the state machine process was started (step 402), then the current state is forced to be the next state (step 442), and the corresponding columns or vectors of the state table are loaded (step 444), as discussed in greater detail below. Then, from either step 440 (if the next state is the same as the current state, such as a from a conflict to be arbitrated) or from step 444, when the run again flag is set (equal to one) in step 446, the method proceeds again, step 460, returning to step 702. If the run again flag is not set in step 446, the method proceeds to return step 450.

FIG. 5 is a state diagram of a table driven state machine for trunk signaling, located in a data communication system or other device, in accordance with the present invention. The trunk signaling state diagram may be implemented, in the preferred embodiment, as a TDSM 300. The states required to implement trunk signaling include a START state 510, an IDLE state 520, a RING state 530, a DIAL state 540, an ON-LINE state 550, a DEVICE DROP state 560, and a NET DROP (network drop) state 570. There are output signals (denoted as current states in FIG. 6) corresponding to each of the above states, which are: TxAB (FIG. 6, byte 7); RING FLAG (FIG. 6, byte 9 (bit 0)); LOOP CURRENT FLAG (FIG. 6, byte 9 (bit 1)); and LINE-IN-USE FLAG (FIG. 6, byte 9 (bit 2)). For example, when the trunk signaling state machine is in the RING state 530, as illustrated in the RING column 770 of FIG. 7, TxAB=(0,0), RING FLAG=1, LOOP CURRENT FLAG=0, and LINE-IN-USE FLAG=1, where a flag value of "1" represents a true condition and a flag value of "0" represents a false condition. Output values for each of the above states is shown in FIG. 7 as the bottom 4 rows 750 in the Trunk Signaling Table 700, with any given set of values corresponding to the particular state of the various states illustrated in the columns 760–790. As mentioned above, and as illustrated in FIG. 3, TxAB is coupled to the switch 200 via the LIU 330 and represents an input to the switch; both the RING FLAG and the LOOP CURRENT FLAG are coupled to the DCD 340 through bus 348, and the DCD 340 responds to this information in accordance with the DCD specifications; and the LINE-IN-USE FLAG is coupled to the network management system 182 to be used in accordance with network management protocol.

Similarly, there are input signals which may cause a transition between states. In addition, some of the output signals (or current states) are also fed back and utilized as input signals. As illustrated in FIG. 7, state column 755 for trunk signaling, the input signals are: (1) the received AB signaling bits, RxAB=(X,Y) in which X and Y may be binary 1 or zero; (2) an off-hook flag, which may be binary 1 or zero; (3) an on-hook flag which may be binary 1 or zero and is always the logical "not" of the off-hook flag; (4) a time-out flag, which may be binary 1 or zero; and (6) a time-out count, which has a value from 0 to 255, and in which the actual time delay (of any incorporated counter) equals (3 milliseconds multiplied by the current value of the time-out count).

Referring to FIG. 5, in light of FIGS. 6 and 7, when the data communication system is installed (connected to the switch via a T1 channel bank), the trunk signal state machine is in a START state 510. In accordance with trunk signaling, the switch 200 sends RxAB=(0,0) or (0,1) to the TDSM 310 of the data communication system 100. In the preferred embodiment, the table driven state machine, initially and currently in the START state 510 examines input signals sequentially as follows: (1) OFF-HOOK FLAG; (2) ON-HOOK FLAG; (3) RxAB; and (4) TIME-OUT, as illustrated in the flow diagram of FIG. 4. If the OFF-HOOK FLAG is "1" or "0" (or if the ON-HOOK FLAG is "1" or "0"), the trunk signaling state machine remains in the START state, as illustrated in the next state transitions of column 760 of FIG. 7. The state machine also remains in the START state when RxAB=(1,0) or (1,1). If RxAB=(0,0) or (0,1), then a transition is made from the START state to the IDLE state 520, as illustrated by the next state=1 in column 760, in which the 1 represents the idle state. Because there are no time delays for trunk signaling, counters or other timing mechanisms are not required and, accordingly, the TIME-OUT FLAG is always "0", the TIMER COUNT has a value of zero for each of the trunk signaling states, and no state transitions occur from these inputs. (For other applications, such as wink signaling, the TIME-OUT FLAG is always equal to "0" except when the timer count goes from a non-zero value (a positive integer) to zero, such that when the timer goes from the non-zero value (a positive integer) to zero, the TIME-OUT FLAG=1). Continuing to refer to FIGS. 5 and 7, following the state transition from the START state 510 to the IDLE state 520, the output signals are TxAB=(0, 0), RING FLAG=0, LOOP CURRENT FLAG=0, and LINE-IN-USE FLAG=0. The trunk signaling state machine will stay in the IDLE STATE until a call is placed by the data communication system 100 (and goes off hook) or the data communication system is notified of an incoming call by the switch 200 via received AB signaling bits.

Continuing to refer to FIGS. 5 and 7, consider the case in which the data communication system places a call. The state machine again examines the input signals sequentially, as illustrated in the flow diagram of FIG. 4. When a call is placed, the OFF-HOOK FLAG equals 1 (the ON-HOOK FLAG=0), the trunk signaling state machine upon sequentially examining the input signals finds that the OFF-HOOK FLAG is "1" and makes a transition to the DIAL state 540, as illustrated by the next state=3 in column 765 of FIG. 7. In the DIAL state, the output signals are TxAB =(1, 1), RING FLAG=0, LOOP CURRENT FLAG=1, and LINE-IN-USE FLAG=1. The DCD will dial a number and upon making a connection, the switch will send to the TDSM receive AB signaling bits with RxAB (1,0)=or (1,1), causing the table driven state machine to transition from the DIAL state 540 to the ON-LINE state 550, as illustrated by the next state=4 in column 775 of FIG. 7. In the ON-LINE state, the output signals are TxAB=(1, 1), RING FLAG=0, LOOP CURRENT FLAG=1, and LINE-IN-USE FLAG=1.

In addition to the case in which the data communication system places a call, the remote DCD 150 may initiate a call. When the remote DCD 150 initiates a call and the trunk signaling state machine is in the IDLE state 520, in response to signals over the network 130, the switch will send RxAB=(1,0) or (1,1) to the TDSM 300. The TDSM 300, upon receiving RxAB=(1,0) or (1,1) from the switch, will transition to the RING state 530, as illustrated by the next state=2 in column 765 of FIG. 7. In the RING state, as illustrated in column 770, the output signals are TxAB =(0, 0), RING FLAG=1, LOOP CURRENT FLAG=0, and LINE-IN-USE FLAG=1. When the DCD receives RING FLAG=1 from the TDSM 300 via connection 348, the DCD 340 will respond by sending an OFF-HOOK FLAG=1 to the table driven state machine. In response to the OFF-HOOK FLAG=1, a transition is made from the RING state 530 to the ON-LINE state 550, as illustrated by the next state=4 in column 770 of FIG. 7. As discussed above, the TDSM may transition from the IDLE state 520 to the ON-LINE state 550 by either a call initiated from the DCD 340 within the data communication system 100 or by a call initiated by the remote DCD 150. The TDSM will stay in the ON-LINE state 550 until the network drops the call (initiated by the remote DCD 150) or the DCD 340 drops the call. When the DCD drops the call, the ON-HOOK FLAG=1, causing a transition to the DEVICE-DROP state 560, as illustrated by the next state=6 in column 780 of FIG. 7. In the DEVICE-DROP state 560, the output signals are TxAB=(0, 0), RING FLAG= 6, LOOP CURRENT FLAG =0, and LINE-IN-USE FLAG= 1. When in the ON-LINE state, a network drop results in RxAB=(0,0) or (0,1) being sent from the switch, causing a transition to the NET-DROP state 570, as illustrated by the next state=5 in column 780 of FIG. 7. In the NET-DROP state 570, the output signals are TxAB=(0, 0), RING FLAG= 6, LOOP CURRENT FLAG=6, and LINE-IN-USE FLAG= 1. A transition from the DEVICE-DROP state to the IDLE state 520 occurs after the ON-HOOK FLAG has transitioned to one (next state remains=6) when the receive AB signaling bits have transitioned to (0,0) or (0, 1), as illustrated by the next state=1 in column 790 of FIG. 7. A transition from the NET-DROP state 570 to the IDLE state 520 occurs after the receive AB signaling bits RxAB have transitioned to and remain at (0,0) or (0,1) (next state remains=5) when the ON-HOOK FLAG transitions to 1, as illustrated by the next state=1 in column 785 of FIG. 7.

There are four transitions illustrated for trunk signaling for the table driven state machine which occur infrequently, but which may be necessary to respond to unusual sequences of input signals. When the trunk signaling machine is in the RING state 530 and RxAB returns to either (0,0) or (0,1), a transition from the RING state 530 to the IDLE state occurs, as illustrated by the next state=1 in column 770 of FIG. 7. This may typically happen when a false IDLE state 520 to RING state transition has occurred previously. Similar returns to an IDLE state may occur from the DIAL state (when the on hook flag=1), and from the DEVICE DROP state and the NET-DROP state (as discussed above), and the DIAL state (when on hook flag=1), as illustrated by the next state=1 in, respectively, columns 775, 790, and 785 of FIG. 7, with the corresponding changes or values in input signals which cause these transitions also illustrated in FIG. 7.

Figure 9:
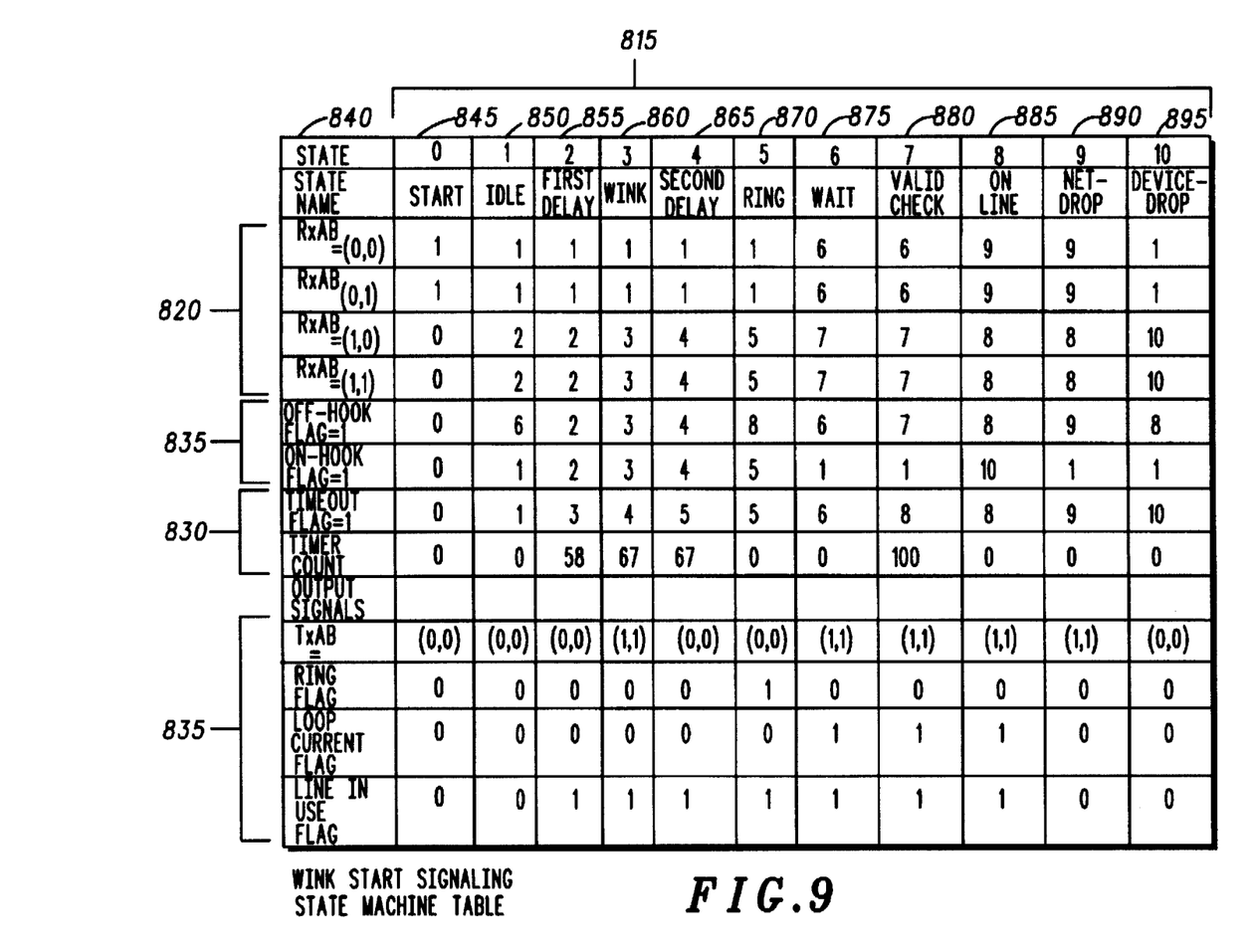
FIG. 9 is a wink start signaling state transition table in accordance with the present invention.

Referring again to FIG. 3 and to the flow diagram for a TDSM 300 illustrated in FIG. 4, when the data communication system 100 is coupled to the switch 200, a state transition table or set of state transition tables (comprising a set of state tables 322), such as the state transition tables illustrated in FIGS. 7 and 9, are stored in memory 320, and the TDSM 300 is then capable of communicating with the switch 200. Initially or upon entry or start up, step 402, the TDSM 300 is in a start state, illustrated as column (or vector) 760 in FIG. 7, and this start state is the current state as represented by the values of the column (or vector) of the state transition table. As the TDSM 300 proceeds with state transitions, such as those which may be triggered by off hook (steps 410 and 412), or by changes in received AB signaling bits (steps 420, 426), the next state is also represented by the values in a column or vector of the state transition table, and those values are loaded into or otherwise utilized by the TDSM 300.

FIG. 5 also illustrates the format for sending a state table to the memory 320 from a network management system 182, from a DTE 170, from a DCD 340, or through some other form of downloading. If a state machine has "n" states, then the TDSM may be represented by a state transition table having n columns or vectors defining each of those n states. To configure the TDSM, n vectors or columns of the state transition table are transferred to the TDSM. In the preferred embodiment, each of the vectors or columns of a state transition table is arranged as a vector having 10 bytes of information, as bytes 0 through 9. For example, the state transition vector for the RING state for trunk signaling, column 770 of FIG. 7, is (in hexadecimal): 01 01 02 02 04 02 02 00 00 05. Byte 9 (05) in binary is 0000 0101, in which the right most bit is the least significant bit. As illustrated in FIG. 5, the three least significant bits of byte 9 are flags, namely, ring flag (third least significant bit), loop current flag (second least significant bit), and line-in-use flag (least significant bit). For trunk signaling, having seven states as illustrated in FIG. 7, a set of seven state vectors forms the trunk signaling state transition table.

FIG. 8 is a wink start timing diagram for implementation in accordance with the present invention, and illustrates the communication that should occur between the data communication system 100 and the switch 200 when the switch is configured for wink start signaling. FIG. 8 is also useful to illustrate how states may be defined for a TDSM 300. When the receive signal 802 has an "A" signaling bit equal to "1" (having transitioned from zero), then the TDSM in the data communication system should respond with a wink transmit signal 804 having on-off-on shape (1-0-1) with specific time periods and delays. The first time period 806 (also referred to as a first delay, measured from the received A bit transition from 0 to 1 before transmitting a wink) is 175 milliseconds, during which the A bit transmitted (TxA) to the switch should be zero (TxA =0). The next time period 808, during which a wink is transmitted (TxA=1), is 200 milliseconds, followed by another time period 810 (referred to as a second delay, following the wink) of 200 milliseconds during which TxA is zero, and followed by another time period 812 (a DCD delay) of having an indeterminate duration during which TxA is also zero. The DCD delay is typically a result of ring/off-hook delay in the DCD 340. Following the time period 812, the transmit A bit will be one while the receive A bit is one. When the receive signaling bit A transitions to zero, the call will be terminated, and there is yet another time period 814 (a network delay) before TxA transitions to zero.

Figure 10:
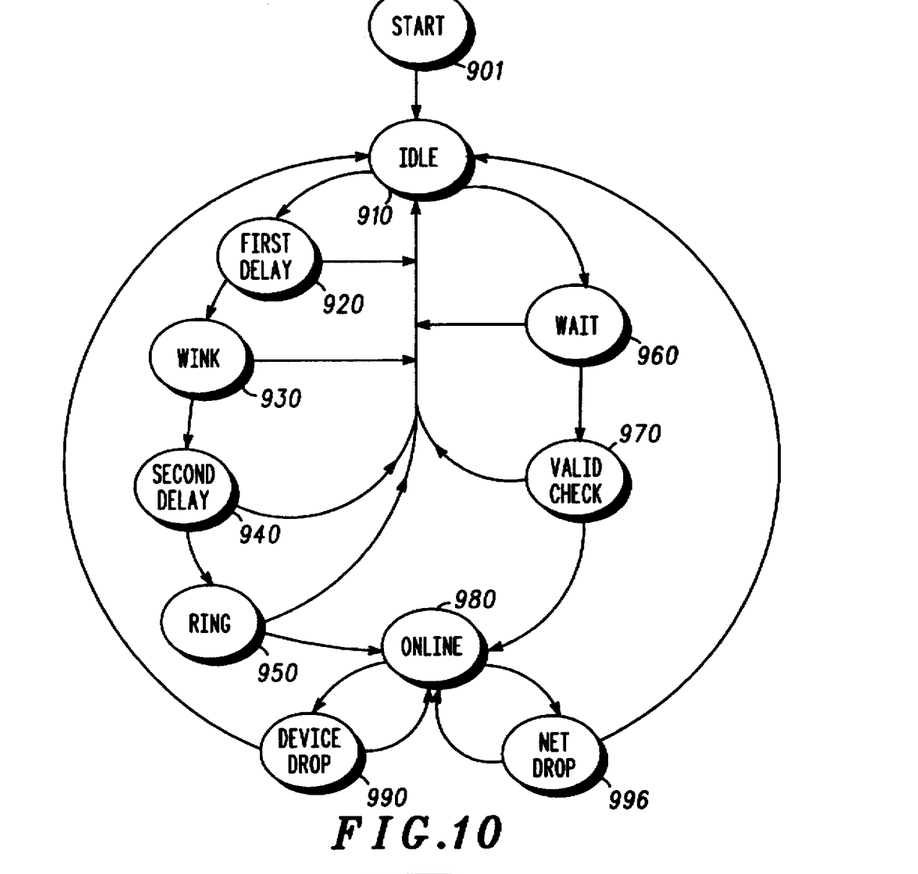
FIG. 10 is a state diagram illustrating wink start signaling in accordance with the present invention.

FIG. 9 is a wink start signaling state transition table in accordance with the present invention, and is comprised of eleven vectors or columns 815, with each column representing a state of a TDSM 300. FIG. 10 is a state diagram (or state transition diagram) illustrating wink start signaling in accordance with the present invention The wink start signaling state transition table of FIG. 9 and state diagram of FIG. 10 may be implemented in a TDSM through the flow diagram of FIG. 4, also as a set of program instructions in the processor 310. Referring to FIG. 9, the operation of the TDSM 300 uses input signals RxAB (rows 820), the OFF-HOOK FLAG and ON-HOOK FLAG (rows 825), and TIME-OUT FLAG and TIMER COUNT (rows 830). The output signals (rows 835) are the same as the signals previously discussed for trunk signaling. In addition to the states of START (column 845), IDLE (column 850), RING (column 870), ON-LINE (column 885), NET-DROP (column 890), and DEVICE DROP (column 895) which also applied to trunk signaling, the wink start state transition table also includes states based upon the time periods and delays (generated by TIMER COUNT values) for a FIRST DELAY state (column 855), a WINK state (column 860), a SECOND DELAY state (column 865), a WAIT state (column 875), and a VALID CHECK state (column 880).

FIG. 10 is a state diagram illustrating wink start signaling in accordance with the present invention. When the data communication system 100 is installed, the TDSM 300 is configured for wink start signaling by downloading the vectors 815 of FIG. 9 into memory 320, utilizing any of the same processes discussed above for trunk signaling. The TDSM 300 configured for wink start signaling also begins in a START state 901 when it is powered up or turned on, and will make a transition to an IDLE state 910 when RxAB= (0,0) or (0,1), as illustrated by the next state=1 in column 845 of FIG. 9. When a call setup is initiated by the network transmitting RxAB=(1,0) or (1,1), a network initiated path is followed which comprises the following transitions, referring to both FIGS. 9 and 10:

(1) from the IDLE state 910 to a FIRST DELAY state 920, as illustrated in FIG. 9 by the next state=2 (column 850), with a change in the LINE-IN-USE FLAG when the TDSM enters the FIRST DELAY state (column 855);

(2) from the FIRST DELAY state 920 to a WINK state 930, as illustrated in FIG. 9 by the next state=3 (when the TIME-OUT FLAG=1 following the TIMER COUNT of 58) (column 855), with a change in the transmit AB signaling bits (TxAB=(1, 1)) when the TDSM enters the WINK state (column 860);

(3) from the WINK state 930 to a SECOND DELAY state 940, as illustrated in FIG. 9 by the next state=4 (when the TIME-OUT FLAG=1 following the TIMER COUNT of 67) (column 860), with a change in the transmit AB signaling bits (TxAB=(0, 0)) when the TDSM enters the SECOND DELAY state (column 865);

(4) from the SECOND DELAY state 940 to a RING state 950, as illustrated in FIG. 9 by the next state=5 (when the TIME-OUT FLAG=1 following the TIMER COUNT of 67) (column 865), with a change in the RING FLAG (set to one) when the TDSM enters the RING state (column 870); and (5) from the RING state 950 to an ON-LINE state 980, as illustrated in FIG. 9 by the next state=8 (when the OFF HOOK FLAG=1) (column 870), with a change in the transmit AB signaling bits (TxAB=(1, 1)) and in the LOOP CURRENT FLAG (set to one) when the TDSM enters the ON-LINE state (column 885).

In the event that RxAB becomes (0,0) or (0, 1) as the network initiated path is followed, the TDSM will return to the IDLE state 910 as illustrated in FIG. 9 by the next state=1 in columns 850, 855, 860, 865, and 850. When the TDSM is in the ON-LINE state 980 (a network connection having been established), a return to the IDLE state 910 may occur via a DEVICE DROP state 990 (next state=10 when ON-HOOK FLAG =1 (column 885)) or a NET DROP state 996 (next state=9 when RxAB=(0,0) or (0, 1) (column 885)), followed by transitioning to the IDLE state (next state=1 when ON HOOK FLAG=1 (columns 890 and 895). A return to the ON LINE state 980 may occur from the DEVICE DROP state when a false OFF-HOOK FLAG is received (next state=8 in column 895) and from the NET DROP state when a false RxAB is received (next state=8 in column 890).

When a call setup is initiated by the DCD 340, to transition from the IDLE state 910 to the ON-LINE state 980 by going off hook, a DCD initiated path is followed which comprises the following transitions, referring to both FIGS. 9 and 10:

(1) IDLE state 910 to a WAIT state (next state=6 when the OFF-HOOK FLAG=1 is sent from the DCD 340 to the TDSM) (column 850);

(2) the WAIT state 960 to a VALID CHECK state 970 (next state=7 when RxAB=(1,0) or (1, 1) (column 875); and (3) the VALID CHECK state 970 to the ON-LINE state 972 (next state=8 when TIME-OUT FLAG=1 following a TIMER COUNT of 100) (column 880.

In addition, if the OFF-HOOK FLAG returns from "1" to "0" while in either the WAIT state 960 or in the VALID CHECK state 970, the TDSM will transition to the IDLE state 910 (next state=1 when the ON HOOK FLAG =1) (columns 875 and 880).

Figure 11:
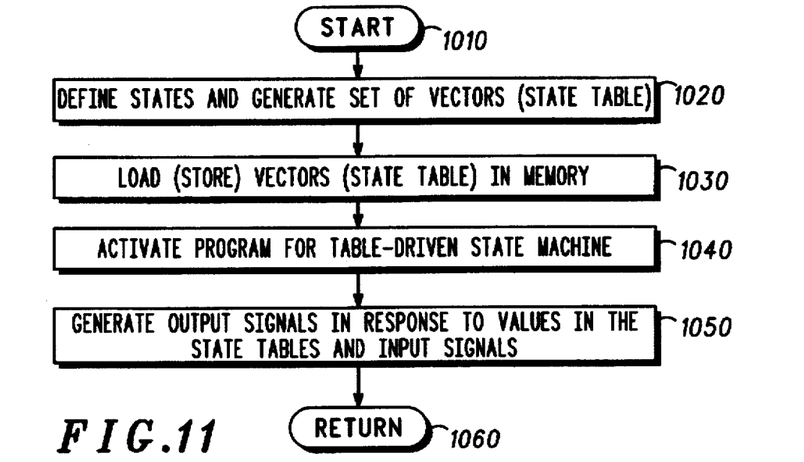
FIG. 11 is a flow diagram illustrating the method in accordance with the present invention.

The method and apparatus of the TDSM 300 may be summarized by the flow diagram of FIG. 11. The process starts, step 1010, when specifications for a predetermined signaling type are selected, such as for trunk signaling, wink start signaling, or other digital signaling. Next, step 1020, states are defined and a state transition table (having vectors defining next states for each current state) is generated, which are designed to meet the specifications for the predetermined signaling type (switch type), step 1020. The set of vectors are then loaded in memory 320, to form the state transition table, such as the tables illustrated in FIG. 7 or FIG. 9, step 1030. When the program for the table driven state machine is activated, step 1040, the data communication system is configured to communicate with the switch in accordance with the predetermined signaling type. Communications with the switch then comprises generating output signals in response to input signals and the values in the state table, step 1050. Because the table driven state machine typically shares processor bandwidth with other data communication system functions, a return to processor should also occur, return step 1060. The table driven state machine program may be activated periodically, may be started by an interrupt signal, or may be started by transitions in receive signaling bits. Once the tables have been generated and loaded, typically a one-time occurrence when the communication system or other DCD is powered up and initialized, only steps 1040 and 1050 are needed to maintain communications between the switch 200 and the data communication system 100.

In summary, FIGS. 3–11 disclose an apparatus 300 for providing signaling between a data communication device 340 and a network 200 switch via a communication channel 330 and 332, in which the network switch 200 has a first predetermined signaling type of a plurality of predetermined signaling types and the network switch provides receive signaling on the communication channel, such as receive AB signaling bits. The apparatus then comprises, first, a memory 320, the memory 320 storing a first plurality of vectors (such as vectors 710 or 815), the first plurality of vectors defining a plurality of state transitions and an output signal; and second, a processor 310 coupled to the memory 320, the processor 310 further coupleable to the communication channel 330 and 332 for reception of the receive signaling from the network switch 200 and for transmission of transmit signaling (such as transmit AB signaling bits) to the network switch 200, the processor 310 further coupleable to the data communication device 340 for reception of an input signal and for transmission of the output signal, the processor 310 responsive through a set of program instructions and through the first plurality of vectors to transmit the transmit signaling and the output signal in response to the receive signaling. In addition, the processor 310 is further responsive, based upon the input signal in conjunction with the receive signaling, to generate a state transition of the plurality of state transitions and to generate corresponding transmit signaling and the output signal.

Also in summary, the first plurality of vectors define the plurality of state transitions and the output signal, and further define the transmit signaling, based upon the receive signaling, the input signal, and the first predetermined signaling type. Moreover, without changing the program instructions illustrated in FIG. 4, a second plurality of vectors may be stored in the memory, the second plurality of vectors defining the plurality of state transitions and the output signal, and further defining the transmit signaling, based upon a second predetermined signaling type of the plurality of predetermined signaling types. Also as discussed above, the output signal may be any one of a plurality of output signals comprising a ring flag, a loop current flag, and a line-in-use flag, and the input signal may be any one of a plurality of input signals comprising an off hook flag, an on hook flag, a time-out flag, and a timer count.

As may be apparent from the discussion above, the apparatus and method of the present invention provides for communication utilizing a wide variety of signaling protocols, which are readily and flexibly modifiable, which do not require the creation of separate and additional programs, and which do not require a significant increase in memory usage. The apparatus and method in accordance with the present invention utilizes a generalized signaling scheme in which a set of signaling parameters, as state table vectors, are incorporated for communication using a specific signaling protocol. By varying the set of parameters within the state table vectors, the apparatus and method of the present invention may be utilized with a wide variety of signaling protocols, without changing the generalized signaling program itself. In addition, any new set of parameters may be readily downloaded into a data communication device or system, providing significant system flexibility and ease of modification in the field. Moreover, the apparatus and method of the preferred embodiment of the invention may be implemented without additional, substantial memory requirements.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. An apparatus for providing signaling between a data communication device and a network switch via a communication channel, the network switch having a first predetermined signaling type of a plurality of predetermined signaling types, the network switch providing receive signaling on the communication channel, the apparatus comprising:

a memory, the memory storing a first plurality of vectors, the first plurality of vectors defining a plurality of state transitions, the first plurality of vectors further defining an output signal; and a processor coupled to the memory, the processor further coupleable to the communication channel for reception of the receive signaling from the network switch and for transmission of transmit signaling to the network switch, the processor further coupleable to the data communication device for reception of an input signal and for transmission of the output signal, the processor responsive through a set of program instructions and through the first plurality of vectors, based on the receive signaling in conjunction with the input signal, to generate a state transition of the plurality of state transitions and to generate corresponding transmit signaling and the output signal.

2. The apparatus of claim 1 wherein the first plurality of vectors define the plurality of state transitions and the output signal, and further define the transmit signaling, based upon the first predetermined signaling type.

3. The apparatus of claim 1 wherein the first plurality of vectors define the output signal and the transmit signaling, based upon the receive signaling, the input signal, and the first predetermined signaling type.

4. The apparatus of claim 1 wherein a second plurality of vectors are stored in the memory, the second plurality of vectors defining the plurality of state transitions and the output signal, and further defining the transmit signaling, based upon a second predetermined signaling type of the plurality of predetermined signaling types.

5. The apparatus of claim 1 wherein a plurality of states and the plurality of state transitions are determined according to the first predetermined signaling type.

6. The apparatus of claim 1 wherein a plurality of states and the plurality of state transitions are determined according to a second predetermined signaling type of the plurality of predetermined signaling types.

7. The apparatus of claim 1 wherein the output signal is any one of a plurality of output signals comprising a ring flag, a loop current flag, and a line-in-use flag.

8. The apparatus of claim 1 wherein the input signal is any one of a plurality of input signals comprising an off hook flag, an on hook flag, a time-out flag, and a timer count.

9. The apparatus of claim 1 wherein the receive signaling is comprised of receive AB signaling bits.

10. The apparatus of claim 1 wherein the transmit signaling is comprised of transmit AB signaling bits.

11. The apparatus of claim 1 wherein the first plurality of vectors defines trunk signaling.

12. The apparatus of claim 1 wherein the first plurality of vectors define wink start signaling.

13. The apparatus of claim 1 wherein the receive signaling and the transmit signaling provide for call establishment.

14. The apparatus of claim 1 wherein the receive signaling and the transmit signaling provide for call termination.

15. An apparatus for providing digital signaling between a data communication device and a network switch via a communication channel, the network switch having a first predetermined digital signaling type of a plurality of predetermined digital signaling types, the network switch providing receive digital signaling on the communication channel, the apparatus comprising:

a memory, the memory storing a first plurality of state vectors, the first plurality of vectors defining a plurality of state transitions and the first plurality of vectors further defining a plurality of output signals, wherein the plurality of state transitions and the plurality of output signals correspond to the first predetermined digital signaling type; and a processor coupled to the memory, the processor further coupleable to the communication channel for reception of the receive digital signaling from the network switch and for transmission of transmit digital signaling to the network switch, the processor further coupleable to the data communication device for reception of an input signal of a plurality of input signals and for transmission of an output signal of the plurality of output signals, the processor responsive through a set of program instructions and through the first plurality of state vectors, based upon the input signal and the receive digital signaling, to generate a state transition of the plurality of state transitions and to generate corresponding transmit digital signaling and the output signal.

16. The apparatus of claim 15 wherein a second plurality of state vectors are stored in the memory, the second plurality of state vectors defining the plurality of state transitions and the plurality of output signals, and further defining the transmit digital signaling, based upon a second predetermined digital signaling type of the plurality of predetermined signaling types.

17. The apparatus of claim 15 wherein the plurality of output signals comprise a ring flag, a loop current flag, and a line-in-use flag.

18. The apparatus of claim 15 wherein the plurality of input signals comprise an off hook flag, an on hook flag, a time-out flag, and a timer count.

19. The apparatus of claim 15 wherein the receive digital signaling is comprised of receive AB signaling bits.

20. The apparatus of claim 15 wherein the transmit digital signaling is comprised of transmit AB signaling bits.

21. An method for providing signaling between a data communication device and a network switch, the network switch having a first predetermined signaling type of a plurality of predetermined signaling types, the network switch providing receive signaling and the data communication device providing an input signal, the method comprising:

(a) storing a first plurality of state vectors, the first plurality of state vectors defining a plurality of state transitions, the first plurality of state vectors further defining both transmit signaling and an output signal, wherein the plurality of state transitions, the transmit signaling and the output signal correspond to the first predetermined signaling type;

(b) receiving the receive signaling;

(c) receiving the input signal;

(d) generating a state transition of the plurality of state transitions, the output signal and the transmit signaling, based upon the first plurality of state vectors, the receive signaling and the input signal; and (e) transmitting the output signal and the transmit signaling.

22. The method of claim 21 wherein step (a) further comprises:

(a1) defining a plurality of states corresponding to the first predetermined signaling type;

(a2) defining the plurality of state transitions corresponding to the first predetermined signaling type;

(a3) determining the output signal and the transmit signaling corresponding to the plurality of state transitions and the first predetermined signaling type;

(a4) generating the plurality of state vectors based upon the plurality of states, the plurality of state transitions, the receive signaling, the input signal, the output signal and the transmit signaling; and (a5) storing the plurality of state vectors.

23. The method of claim 21 wherein step (a) further comprises:

(a) storing a second plurality of state vectors, the second plurality of state vectors defining the plurality of state transitions and the output signal, and further defining the transmit signaling, based upon a second predetermined signaling type of the plurality of predetermined signaling types.

24. The method of claim 21 wherein the output signal is any one of a plurality of output signals comprising a ring flag, a loop current flag, and a line-in-use flag.

25. The method of claim 21 wherein the input signal is any one of a plurality of input signals comprising an off hook flag, an on hook flag, a time-out flag, and a timer count.

26. The method of claim 21 wherein the receive signaling is comprised of receive AB signaling bits.

27. The method of claim 21 wherein the transmit signaling is comprised of transmit AB signaling bits.

28. The method of claim 21 wherein the first plurality of state vectors define trunk signaling.

29. The method of claim 21 wherein the first plurality of state vectors define wink start signaling.

30. The method of claim 21 wherein the receive signaling and the transmit signaling provide for call establishment.

31. The method of claim 21 wherein the receive signaling and the transmit signaling provide for call termination.

32. An apparatus for providing signaling between a data communication device and a network switch via a communication channel, the network switch having a first predetermined signaling type of a plurality of predetermined signaling types, the network switch providing receive signaling on the communication channel, the apparatus comprising:

a memory, the memory storing a first plurality of vectors, the first plurality of vectors defining a plurality of state transitions, the first plurality of vectors further defining an output signal; and a processor coupled to the memory, the processor further coupleable to the communication channel for reception of the receive signaling from the network switch and for transmission of transmit signaling to the network switch, the processor further coupleable to the data communication device for reception of an input signal and for transmission of the output signal, the processor responsive through a set of program instructions and through the first plurality of vectors, based on the receive signaling, to generate a state transition of the plurality of state transitions and to generate corresponding transmit signaling and the output.

33. An apparatus for providing signaling between a data communication device and a network switch via a communication channel, the network switch having a first predetermined signaling type of a plurality of predetermined signaling types, the network switch providing receive signaling on the communication channel, the apparatus comprising:

a memory, the memory storing a first plurality of vectors, the first plurality of vectors defining a plurality of state transitions, the first plurality of vectors further defining an output signal; and a processor coupled to the memory, the processor further coupleable to the communication channel for reception of the receive signaling from the network switch and for transmission of transmit signaling to the network switch, the processor further coupleable to the data communication device for reception of an input signal and for transmission of the output signal, the processor responsive through a set of program instructions and through the first plurality of vectors, based on input signal, to generate a state transition of the plurality of state transitions and to generate corresponding transmit signaling and the output signal in response to the receive signaling.

* * * * *